(12) United States Patent
Offord et al.

(10) Patent No.: US 7,662,873 B2
(45) Date of Patent: Feb. 16, 2010

(54) METHODS FOR MARKING FIBROUS SUBSTRATES

(75) Inventors: David A. Offord, Castro Valley, CA (US); William Ware, Jr., Redwood City, CA (US)

(73) Assignee: Nano-Tex, Inc., Oakland, CA (US)

( * ) Notice: Subject to any disclaimer, the term of this patent is extended or adjusted under 35 U.S.C. 154(b) by 722 days.

(21) Appl. No.: 10/545,598

(22) PCT Filed: Feb. 20, 2004

(86) PCT No.: PCT/US2004/004993

§ 371 (c)(1),
(2), (4) Date: Oct. 31, 2005

(87) PCT Pub. No.: WO2004/076505

PCT Pub. Date: Sep. 10, 2004

(65) Prior Publication Data

US 2006/0135682 A1    Jun. 22, 2006

Related U.S. Application Data

(60) Provisional application No. 60/449,297, filed on Feb. 22, 2003.

(51) Int. Cl.
*C08F 122/02* (2006.01)
*C09D 5/02* (2006.01)

(52) U.S. Cl. ..................................................... 524/109

(58) Field of Classification Search ................. 524/109, 524/556

See application file for complete search history.

(56) References Cited

U.S. PATENT DOCUMENTS

| 4,954,547 | A | * | 9/1990 | Branning ..................... 524/232 |
| 5,650,248 | A | | 7/1997 | Miekka et al. |
| 6,224,988 | B1 | | 5/2001 | Ueda et al. |
| 6,610,386 | B2 | * | 8/2003 | Williams et al. ......... 428/195.1 |
| 2002/0104762 | A1 | | 8/2002 | Stonas et al. |

FOREIGN PATENT DOCUMENTS

WO    WO-2004/076505 A1    9/2004

OTHER PUBLICATIONS

Adanur, S. et al. eds. (1995). *Wellington Sears Handbook of Industrial Textiles*, Technomic Publishing Co.: Lancaster, PA, pp. 8-11.
International Search Report mailed Aug. 11, 2004 for PCT Application No. PCT/US04/04993, 2 pages.

* cited by examiner

*Primary Examiner*—Robert D. Harlan
(74) *Attorney, Agent, or Firm*—Jacqueline S. Larson

(57) ABSTRACT

The present invention is directed to the preparation of fibrous substrates, including textiles, marked with colloidal particle nanobar codes, to the fibrous substrates so prepared, and to methods for detecting the nanobar codes on the fibrous substrates for use in quality control, counterfeiting, and the like.

20 Claims, No Drawings

METHODS FOR MARKING FIBROUS SUBSTRATES

CROSS REFERENCE TO RELATED APPLICATIONS

This application is filed under 35 U.S.C. §371 and claims priority to International Application Ser. No. PCT/US2004/004993, filed Feb. 20, 2004, which claims priority under 35 U.S.C. §119 to provisional application Ser. No. 60/449,297, filed Feb. 22, 2003, the disclosure of which is incorporated herein by reference.

FIELD OF THE INVENTION

The present invention is directed to the preparation of fibrous substrates, including textiles, marked with colloidal particle nanobar codes, to the fibrous substrates so prepared, and to methods for detecting the nanobar codes on the fibrous substrates for use in quality control, counterfeiting, and the like.

BACKGROUND OF THE INVENTION

It would be desirous to mark textiles and textile products for a number of reasons, including supply chain tracking, failure/liability analysis, and reduction of transshipments/grey market diversion/counterfeiting. Such marking should be easy to apply to the textile and easy to read, yet not damage or change the character of the textile nor be easy to reproduce (to avoid copying and counterfeiting).

NANOBARCODES™ particles (Nanoplex Technologies, Inc., Mountain View, Calif.) are encodeable, machine-readable, durable, nanoparticulate identification tags. These particles are disclosed in U.S. Pat. Appln. Publn. No. US 2002/0104762 A1. The particles are manufactured in a semi-automated, highly scalable process by electroplating inert metals (such as gold, nickel, platinum, or silver) into templates that define the particle diameter, and then releasing the resulting striped nano-rods from the templates. These templates can be obtained commercially and subsequently modified, or they can be designed from scratch using lithographic processes developed by the semiconductor industry.

Just as conventional barcode is read by measuring the differential contrast between adjacent black and white lines using an optical scanner, individual NANOBARCODES particles are read by measuring the differential reflectivity between adjacent metal stripes within a single particle using a conventional optical microscope. NANOBAR™ software (Nanoplex Technologies, Inc.) then identifies which particles are present in a fraction of a second.

SUMMARY OF THE INVENTION

The present invention is directed to a process for attaching nanoscopic-sized bar codes ("nanobar codes"), such as but not limited to NANOBARCODES™ particles, to textiles and other fibrous substrates. The nanobar codes are durably attached to the fibrous substrate and further are readily identifiable for reading. More particularly, the fibrous substrates are tagged with nanobar code particles mixed with a fluorophore and a particles binder to give the treatment preparation. The particles binder of the present invention comprises a polymer, preferably a carboxyl-containing polymer or polycarboxylate; a petroleum distillate; one or more sorbitan monooleates; ammonium hydroxide; and water. It may optionally further include a resin.

The particles binder durably attaches the nanobar code particles to the fibrous substrate. The fluorophore allows identification of the location on the fabric or garment of the particles by UV fluorescence, such as by illumination under "black" light. Once the location or locations are identified, the particles are read under a microscope and interpreted with appropriate recognition software, such as the NANOBAR™ software.

The invention is further directed to fibers, yarns, fabrics, textiles, finished goods, or non-woven goods (encompassed herein under the terms "fibrous substrates", "textiles" or "fabrics") that have been treated with a treatment preparation comprising nanobar code particles. The particles are durably affixed to the treated fibrous substrates.

DETAILED DESCRIPTION OF THE INVENTION

The particles binder of the present invention comprises a polymer, preferably a carboxyl-containing polymer or "polycarboxylate"; a petroleum distillate; one or more sorbitan monooleates; ammonium hydroxide; and water. It may optionally further include a resin. The binder durably attaches the nanobar code particles to the fibrous substrate. By "durably" is meant that the particles remain on the substrate for a minimum of five home launderings. The inclusion of a resin will increase the number of home launderings. In one embodiment, the particles will remain on the substrate for 10 or more, preferably for at least 25 home launderings. In another embodiment, the treatment is permanent; that is, the nanobar code particles are present for the life of the treated fibrous substrate.

In a presently preferred embodiment, the particles binder comprises from about 10 wt % to about 50 wt % of a petroleum distillate, from about 2 wt % to about 25 wt % of one or more sorbitan monooleates, from about 5 wt % to about 40 wt % of a polycarboxylate, and from about 5 wt % to about 40 wt % of ammonium hydroxide, the remainder being water. The optional resin is present in the particles binder in an amount of from 0 wt % to about 15 wt % in the particles binder.

The treatment preparation of the invention comprises the particles binder, a fluorescent dye or fluorophore, nanobar code particles, and water. In a presently preferred embodiment, the treatment preparation comprises from about 0.5 wt % to about 5 wt % of particles binder, from about 0.005 wt % to about 0.1 wt % of fluorescent dye, and from about 0.1 wt % to about 5 wt % of nanobar code particles, with the remainder being water.

The nanobar code particles are introduced onto the fibrous substrate, such as a fabric or a textile, during the finishing step in textile manufacturing. The fabric finishing step typically consists of dipping fabrics in finishing solution, padding the fabrics, and drying the fabrics in an oven. The treatment preparation containing the particles may be introduced onto the fabric using existing printing equipment, and introduction occurs after padding the fabric and before entry into the oven. Alternatively, a simple dropping device, such as those known in the art, can be utilized in place of the printing equipment.

In one embodiment, the nanobar code particles are applied to fabric in approximately 1 square centimeter dots or spots. Application of about nine such spots per square yard of fabric will ensure that all fabric and garments made from the fabric will be properly tagged. In a presently preferred embodiment, NANOBARCODES particles are used, and each spot will contain approximately 100,000 of these particles, together with the fluorescent dye marker and the particles binder, while weighing approximately 0.02 grams. During the oven process, most of that weight will evaporate due to the spots' large water composition. The remainder of the binder is composed of cellulosic paste. Thus, the total mass change per dot would be an extremely small amount of carbohydrates (on the order of 0.0004 grams, for example), minimizing any effects to the fabric (color, hand, and the like) and garment. The dot would thus be undetectable to the end consumer.

Another benefit of the present marking system is the miniscule amounts of waste it presents. Due to the sub-micron size of the NANOBARCODES particles, only minimal amounts of metal, on the order of $10^{-6}$ grams per spot, or $10^{-5}$ grams per square yard would be present. The NANOBARCODES particles themselves, as well as the binder, are invisible to the human eye and touch. The spots can be quickly found on the fabric by using UV fluorescence, such as a "black" light, and subsequently the pattern on the NANOBARCODES particles is read.

Readers for reading and interpreting the nanobar code particles utilize conventional microscopes and the appropriate software for reading bar codes. In the case of NANOBARCODES™ particles, NANOBAR™ software is utilized. The readers are capable of producing accurate results very quickly. The readers can simultaneously test for the presence of any or all codes. The readers can confirm the successful attachment of the particles at textile mills during initial application. They can also be used for periodic quality control during the manufacturing process. They may be further used by, for example, customs agents to authenticate that garments entering the United States are made from finished fabric made in and exported from the United States, to detect and deter the entry of grey market goods.

NANOBARCODES™ encoded particles are particularly useful in the present invention. Their small size makes them an ideal covert tag, invisible to the human eye. By varying the length and width of the stripes in the barcode, the number and type of metals used, or the number, width, and order of the stripes, libraries of thousands of uniquely identifiable particle types can be prepared. When used in combinations, the number of unique codes goes up exponentially. Because the particles are made in customizable templates, particles can be made with unique shapes and sizes that can be changed repeatedly over time. Additionally, the software that identifies the particles can be fine-tuned to accept or reject particular particle shapes and sizes, as well as particular types. Further, because the NANOBARCODES particles are made from inert metals, they are insensitive to temperature, ambient light, pH, and mechanical stress. Unlike most organic or fluorescence-based tagging systems, NANOBARCODES particles will survive stressful manufacturing or environmental conditions and still permit accurate detection and read-out.

The carboxyl-containing polymers ("polycarboxylates") for use in the treatment preparation of the invention can be obtained through polymerization or copolymerization of one or more monomers that contain a carboxyl group, a carboxylate, or a group that can become a carboxyl or carboxylate group through a chemical reaction (a "carboxyl precursor group"). Non-limiting examples of such monomers include: acrylic acid; methacrylic acid; aspartic acid; glutamic acid; β-carboxyethyl acrylate; maleic acid; monoesters of maleic acid [ROC(O)CH=CHC(O)OH, where R represents a chemical group that is not hydrogen]; maleic anhydride; fumaric acid; monoesters of fumaric acid [ROC(O)CH=CHC(O)OH, where R represents a chemical group that is not hydrogen]; acrylic anhydride; crotonic acid; cinnamic acid; itaconic acid; itaconic anhydride; monoesters of itaconic acid [ROC(O)CH$_2$(=CH$_2$)C(O)OH, where R represents a chemical group that is not hydrogen]; saccharides with carboxyl (e.g. alginic acid), carboxylate, or carboxyl precursor groups; and macromonomers that contain carboxyl, carboxylate, or carboxyl precursor groups. Carboxyl precursors include, but are not limited to, acid chlorides, N-hydroxysuccinimidyl esters, amides, esters, nitriles, and anhydrides. Examples of monomers with carboxyl precursor groups include (meth)acrylate chloride, (meth)acrylamide, N-hydroxysuccinimide (meth)acrylate, (meth)acrylonitrile, asparigine, and glutamine. Herein the designation "(meth)acryl" indicates both the acryl- and methacryl-versions of the monomer. Preferred carboxylate cations include aluminum, barium, chromium, copper, iron, lead, nickel, silver, strontium, zinc, zirconium, and phosphonium ($R_4P^+$). More preferred cations include hydrogen, lithium, sodium, potassium, rubidium, ammonium, calcium, and magnesium. The polymers may be linear or branched. In a presently preferred embodiment, the polymers are branched, and more preferably they have between about 0.001% and about 10% branching, inclusive. Preferred monomers are acrylic acid, methacrylic acid and β-carboxyethyl acrylate.

Acrylate polymers containing carboxyl groups are commercially available. In particular, poly(acrylic acid) is in wide production worldwide for use as a "super-absorbent" in disposable diapers and as a thickener in printing pastes. Poly(acrylic acid) can be obtained from, among other sources, Polycryl AG, Bohler, Posffach, CH-6221 Rickenbach, Switzerland (trade name: Polycryl); Stockhausen, 2401 Doyle Street, Greensboro, N.C., 27406-2911; and BFGoodrich, Four Coliseum Centre, 2730 West Tyvola Rd., Charlotte, N.C. 28217-4578 (trade name: Carbopol). The presently preferred polycarboxylate is poly(acrylic acid) (PAA).

Fluorescent dyes or fluorophores are well known, and those useful in the present invention are known to those of skill in the textile arts, or can be determined without undue experimentation. Any such fluorescent dyes or fluorophores are encompassed within the present invention.

Sorbitan monooleates useful in the present invention include, but are not limited to, sorbitan monooleate, polyethylene sorbitan monooleate, and polyoxyethylene sorbitan monooleate.

A resin is optionally included in the particles binder to further increase the durability of the nanobar codes particles on the fibrous substrate. Resins useful in the present invention are known to those of skill in the textiles art or may be determined without undue experimentation and include, but are not limited to, the following crosslinking moieties: isocyanates, epoxides, divinylsulfones, aldehydes, chlorohydrins, N-methylol compounds, and polycarboxylic acids. Of these, N-methylol compounds are the most useful. Examples include dimethylol urea, dimethylol ethylene urea, trimethylol trazine, dimethylol methyl carbamate, uron, triazone, and dimethylol dihydroxy ethylene urea.

Other binders, for example those used in the paper and textile industries, may be employed as the particles binder in the present invention by one skilled in the art.

The invention is further directed to fibrous substrates treated with the treatment preparation comprising nanobar code particles. These treated fibrous substrates can be used in a variety of ways including, but not limited to, the following: clothing, upholstery and other interior furnishings, hospital and other medical uses, and industrial uses. The *Wellington Sears Handbook of Industrial Textiles* (Ed. S. Adanur, Technomic Publishing Co., Lancaster, Pa., 1995, p. 8-11) lists a number of potential uses.

The fibrous substrates of the present invention are intended to include fibers, fabrics and textiles, and may be sheet-like structures (woven, knitted, tufted, stitch-bonded, or non-woven) comprised of fibers or structural elements. Included with the fibers can be non-fibrous elements, such as particulate fillers, binders, and sizes. The textiles or webs include fibers, woven and non-woven fabrics derived from natural or synthetic fibers or blends of such fibers. They can comprise fibers in the form of continuous or discontinuous monofilaments, multifilaments, staple fibers, and yarns containing such filaments and/or fibers, which fibers can be of any desired composition. Mixtures of natural fibers and synthetic fibers may also be used. Examples of natural fibers include cotton, wool, silk, jute, and linen. Examples of man-made fibers include regenerated cellulose rayon, cellulose acetate, and regenerated proteins. Examples of synthetic fibers include, but are not limited to, polyesters (including polyethyleneterephthalate and polypropyleneterephthalate), polyamides (including nylon), acrylics, olefins, aramids, azions, modacrylics, novoloids, nytrils, aramids, spandex, vinyl polymers and copolymers, vinal, vinyon, vinylon, Nomex® (DuPont) and Kevlar® (DuPont).

EXAMPLES

Example 1

Preparation of a Particles Binder

25 Weight percent Isopar M petroleum distillate (ExxonMobil Chemical), 3.7 wt % Span 80 sorbitan monooleate, 7.5 wt % Tween 80 polyoxyethylene(20) sorbitan monooleate, 15 wt % Carbopol 846 poly(acrylic acid) [viscosity cP (% solids)= 35000 (0.35); Noveon, Inc.], 15 wt % ammonium hydroxide, and 33.8 wt % water were added together and mixed to form a binder for nanobar code particles.

Example 2

Preparation of Nanobar Code Particles Printing Paste (Treatment Preparation)

2 Weight percent of the particles binder from Example 1, 0.0225 wt % fluorescent dye, and 1 wt % NANOBARCODES™ particles (1 billion bars per gram of NANOBARCODES) were added to 97.9775 wt % water and mixed together to give the treatment preparation for use as a printing paste for application to a fibrous substrate.

Example 3

The printing paste from Example 2 was applied to a fabric as follows:
A thin coat of the printing paste was placed on the end of a 1 cm diameter stainless steel rod. The end of the rod was touched to fabric to transfer the paste onto the fabric. The approximate mass of wet printing paste transferred (wet pickup) is 20 mg. The treated fabric was then dried in an oven at 100° C. for 5 minutes.
The locations of the NANOBARCODES particles were detected by black (UV) light. The printing paste was placed on a wide variety of colored backgrounds, including black, browns and greens, and the NANOBARCODES particles could be read from all of these.

What is claimed is:

1. A particles binder for binding nanoscopic bar codes to a fibrous substrate, the particles binder comprising a polycarboxylate, petroleum distillate, one or more sorbitan monooleates, ammonium hydroxide, and water, and wherein the particles binder optionally further comprises a resin.

2. A particles binder according to claim 1 which comprises from about 10 wt % to about 50 wt % of a petroleum distillate, from about 2 wt % to about 25 wt % of one or more sorbitan monooleates, from about 5 wt % to about 40 wt % of a polycarboxylate, and from about 5 wt % to about 40 wt % of ammonium hydroxide.

3. A particles binder according to claim 1 or 2 wherein the polycarboxylate is poly(acrylic acid).

4. A treatment preparation for introducing nanoscopic bar codes to a fibrous substrate, the treatment preparation comprising nanoscopic nanobar code particles, a fluorescent dye or fluorophore, a particles binder, and water.

5. A treatment preparation according to claim 4 which comprises from about 0.5 wt % to about 5 wt % of particles binder, from about 0.005 wt % to about 0.1 wt % of fluorescent dye or fluorophore, and from about 0.1 wt % to about 5 wt % of nanobar code particles.

6. A treatment preparation according to claim 4 or 5 wherein the particles binder is selected from those binders useful in the paper or textiles industries.

7. A treatment preparation according to claim 4 or 5 wherein the particles binder is selected from binders according to claim 1.

8. A treatment preparation according to claim 4 or 5 wherein the nanobar code particles are metallic nanoparticles having machine-readable barcodes.

9. A process for attaching nanoscopic bar codes to a fibrous substrate, the process comprising:
   mixing nanoscopic nanobar code particles with a fluorescent dye or fluorophore, a particles binder, and water to give a treatment preparation;
   introducing the treatment preparation onto the surface of a fibrous substrate; and
   drying the fibrous substrate;
   wherein the nanobar code particles are durably attached to the fibrous substrate and readily identifiable for reading.

10. A process according to claim 9 wherein the treatment preparation comprises from about 0.5 wt % to about 5 wt % of particles binder, from about 0.005 wt % to about 0.1 wt % of fluorescent dye or fluorophore, and from about 0.1 wt % to about 5 wt % of nanobar code particles.

11. A process according to claim 9 or 10 wherein the particles binder is selected from those binders useful in the paper or textiles industries.

12. A process according to claim 9 or 10 wherein the particles binder is selected from binders according to claim 1.

13. A process according to claim 9 or 10 wherein the nanobar code particles are metallic nanoparticles having machine-readable barcodes.

14. A fibrous substrate comprising nanoscopic bar codes durably attached to the fibrous substrate and readily identifiable for reading.

15. A fibrous substrate according to claim 14 wherein the nanoscopic bar codes are metallic nanoparticles having machine-readable barcodes.

16. A fibrous substrate according to claim 14 wherein the nanoscopic bar codes are attached to the fibrous substrate according to the process of claim 9.

17. A fibrous substrate according to claim 16 wherein the nanoscopic bar codes are metallic nanoparticles having machine-readable barcodes.

18. A treatment preparation according to claim 4 or 5 wherein the particles binder is selected from binders according to claim 2.

19. A process according to claim 9 or 10 wherein the particles binder is selected from binders according to claim 2.

20. A fibrous substrate according to claim 14 wherein the nanoscopic bar codes are attached to the fibrous substrate according to the process of claim 10.

* * * * *

UNITED STATES PATENT AND TRADEMARK OFFICE
CERTIFICATE OF CORRECTION

PATENT NO. : 7,662,873 B2  Page 1 of 1
APPLICATION NO. : 10/545598
DATED : February 16, 2010
INVENTOR(S) : Offord et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1143 days.

Signed and Sealed this

Thirtieth Day of November, 2010

David J. Kappos
*Director of the United States Patent and Trademark Office*